United States Patent [19]

Stephens et al.

[11] Patent Number: 4,482,407

[45] Date of Patent: Nov. 13, 1984

[54] PLASTICIZER SYSTEM FOR PROPELLANT COMPOSITIONS

[75] Inventors: William D. Stephens, Huntsville, Ala.; Brenda K. Rodman, Catlett, Va.

[73] Assignee: The United States of America as represented by the Secretary of the Air Force, Washington, D.C.

[21] Appl. No.: 497,445

[22] Filed: May 23, 1983

[51] Int. Cl.$^3$ ............................................. C06B 45/10
[52] U.S. Cl. ................................. 149/19.4; 149/19.9; 560/157
[58] Field of Search .......................... 149/19.4, 19.9; 560/157

[56] References Cited

U.S. PATENT DOCUMENTS

| | | | |
|---|---|---|---|
| 3,740,279 | 6/1973 | Levering et al. | 149/19.91 |
| 4,001,191 | 1/1977 | Reed | 149/19.91 |
| 4,098,626 | 7/1978 | Graham et al. | 149/19.4 |
| 4,210,568 | 7/1980 | Makowski et al. | 260/32.4 |
| 4,242,488 | 12/1980 | Stanley et al. | 428/423.1 |
| 4,340,686 | 7/1982 | Foss | 525/59 |

OTHER PUBLICATIONS

Nagasawa et al., *Chem. Abs.*, 62, abs. #6488a, (1965).

*Primary Examiner*—Edward A. Miller
*Attorney, Agent, or Firm*—Donald J. Singer; William J. O'Brien

[57] ABSTRACT

The present invention concerns itself with the synthesis of N-octyl(2-ethylhexyl)urethane and its use as an internal plasticizer for isocyanate-cured solid propellant compositions.

1 Claim, No Drawings

PLASTICIZER SYSTEM FOR PROPELLANT COMPOSITIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to solid propellant compositions and to an improved plastercizer system for use therewith. In a more particular aspect, this invention concerns itself with a novel, branch-chained, saturated, carbamic acid ester having a particular molecular structure and to its use as an internal plasticizer for isocyanate-cured propellant compositions.

The increased interest and utilization of solid propellant compositions has spawned a considerable research effort in an attempt to improve their ballistic and physical properties. Generally, solid propellants are composed of one or more organic or inorganic oxidizers dispersed in a resinous binder matrix which may also function as a fuel. Typical oxidizers are ammonium perchlorate or HMX (cyclotetramethylene tetranitramine), both of which are well known in the art. Various resinous components, such as hydrocarbons, polyesters, polyurethanes and other like materials may serve as a binder/fuel matrix. A supplemental fuel component, such as finely powered aluminum, may be used also. Other additive components, such as anti-oxidants, burning rate modifiers, wetting agents, anti-foaming agents and plasticizers may be added to the propellant composition, if desired. Dibutylphthalate, dioctyl adipate or triacetin are often employed as inert plasticizers in combination with the resinous binder material.

Plasticizers are used in rocket propellants for a number of purposes. These include processing assistance by incorporation of fluid materials in the propellant mix, the improvement of low temperature flexibility and the improvement of mechanical properties and ballistic characteristic. In using solid propellants, however, a problem exists in the use of plasticizers because of the tendency of the plasticizer molecules to migrate or evaporate out of the propellant composition during storage. Either of these processes results in chemical changes in the composition which are harmful to the propellant and to other inert parts of the rocket motor. Changes in the mechanical properties of the propellant often occur during long term storage, particularly near the liner-propellant bond. Other negative effects which are associated with the use of plasticizers include crystallization at low temperatures, a tendency to soften the propellant excessively at high temperatures, and the fact that the plasticizer may migrate into the liner from the uncured propellant much more rapidly than it does from a cured propellant system.

As a consequence of the above, a continuing research effort has been maintained in an attempt to solve the migration problem associated with propellant plasticizers and to provide a plasticizer that does not migrate rapidly even in an uncured propellant. One research effort involved the use of a material known as ZL-496. This material, ZL-496, is a polybutadiene with a molecular weight of approximately 3,000. The use of ZL-496, as a plasticizer, was contemplated because its molecular size is quite large and it was believed that its polymer chain entanglement would prevent migration. Unfortunately, it was found that even plasticizer molecules as large as ZL-496 have a tendency to migrate out of the propellant composition, thus shortening the shelf life of the rocket motor.

In furthering the research effort referred to above, however, it was unexpectedly discovered that a branch-chained, saturated, carbamic acid ester having a particular molecular structure could be utilized as a plasticizer in the fabrication of solids propellants. This novel plasticizer replaces the conventional plasticizer generally utilized in composite propellants, especially those having a binder base which uses an isocyanate cure reaction for its curing system. The resulting propellant exhibits a minimum amount of plasticizer migration during a normal shelf-life period.

SUMMARY OF THE INVENTION

In accordance with this invention, there is provided a novel compound which acts effectively as a propellant plasticizer without the attendant problems of plasticizer migration that often occur during propellant storage. The plasticizer of this invention is a carbamic acid ester having a particular molecular structure as illustrated by the following structural formula.

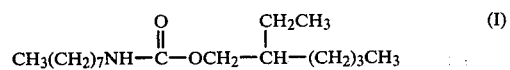

$$CH_3(CH_2)_7NH-\overset{O}{\overset{\|}{C}}-OCH_2-\overset{CH_2CH_3}{\overset{|}{CH}}-(CH_2)_3CH_3 \quad (I)$$

This plasticizer is used in a propellent composition in a binder/plasticizer ratio ranging from about 75 to 95 parts by weight binder to 5 to 25 parts by weight of plasticizer.

Accordingly, the primary object of this invention is to provide a novel carbamic acid ester plasticizer having a particular molecular structure.

Another object of this invention is to provide a novel solid propellant composition that produces only minimum amounts of plasticizer migration during its storage shelf-life.

Still another object of this invention is to provide a novel carbamic acid ester that finds particular utility as an internal plasticizer for solid propellant compositions.

The above and still other objects and advantages of the present invention will become more readily apparent upon consideration of the following detailed description thereof.

DESCRIPTION OF THE PREFERRED EMBODIMENTS

With the above-mentioned and other objects in mind, the present invention contemplates the synthesis of a novel carbamic acid ester and its utilization as an internal plasticizer for conventional composite solid propellants.

The novel plasticizer contemplated by the present invention is a N-octyl(2-ethylhexyl)urethane. It is a branch-chained, saturated, carbamic acid ester having the following structural formula:

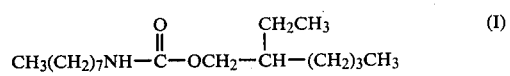

$$CH_3(CH_2)_7NH-\overset{O}{\overset{\|}{C}}-OCH_2-\overset{CH_2CH_3}{\overset{|}{CH}}-(CH_2)_3CH_3 \quad (I)$$

It is believed that the particular molecular structure illustrated in Formula (I) above provides a particular advantage for the use of this ester-ether as an internal plasticizer. The plasticizer links to the binder network of the propellant and is unable to migrate or evaporate away from the propellant during storage. This provides the propellant with an excellent shelf-life.

The synthesis of the N-octyl(2-ethylhexyl)urethane plasticizer of this invention is accomplished by effecting a reaction between an equimolar mixture of octylisocyanate and 2-ethyl-1-hexanol. The reaction is illustrated by the following reaction scheme.

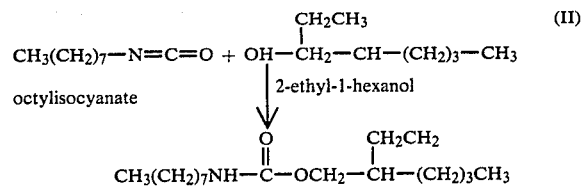

Example 1, which follows, discloses the experimental details of the reaction and the method of synthesis illustrated by equation (II).

EXAMPLE I

N-Octyl(2-ethylhexyl)urethane 310 g (0.2 moles) of octylisocyanate (155 g/mole) were mixed with 33.2 g (0.2 moles) of 2-ethyl-1-hexanol (MW=166 g/mole) in a flask of appropriate size. The flask was covered with a watchglass and aluminum foil and set in a 170° F. oven. The disappearance of the isocyanate was monitored by FT-IR. The isocyanate was 100% reacted after 24 hours. The plasticizer was stored over molecular sieves.

An illustration showing the use of the novel internal plasticizer of this invention in a solid propellant is shown in Table I as follows. Although ammonium perchlorate and an isocynate-cured polybutadiene binder are preferred, other conventional oxidizing and resinous binders may be utilized, if desired, as well as other conventional propellant components. Solid propellant compositions are well known and since the basic preparation and constituent ingredients of the propellant composition of this invention are not significantly altered or critical to the execution of the invention, with the exception of the internal plasticizer component, a detailed explanation of the propellant's preparation is not deemed necessary. The plasticizer of this invention is pre-reacted with the isocyanate curing agent, and then incorporated into the propellant mix in a conventional manner at any stage prior to cure. Generally, all of the ingredients are homogenously mixed in a conventional blender. After mixing, the uncured propellant mix is then placed in an oven and cured at a temperature and for a period of time sufficient to produce a firm, rubbery, solid propellant. The resulting propellant differs from a conventional propellant composition only in the essential replacement of the conventional plasticizer with the novel internal plasticizer of this invention.

TABLE I 68.0 parts by weight of ammonium perchlorate.
7.45 parts by weight of hydroxy-terminated polybutadiene (R-45M)
22.0 parts by weight of aluminum powder fuel
0.25 parts by weight of a curing agent, isophorone diisocyanate (IPDI)
2.0 parts by weight of the internal plasticizer of this invention. The plasticizer was prereacted with the IPDI 0.30 parts by weight of a bonding agent, HX-752 0.075 parts by weight of a delayed quick-cure catalyst (equal parts MgO, Triphenyl Bismuth, and Maleic Anhydride).

The ingredients of Table I were thoroughly mixed in a conventional mixer until a homogenous mixture had been obtained. The uncured propellant was then placed in an oven at 170° F. for 7 days. At that time, a firm, rubbery, solid propellant was obtained.

Table II, which follows, illustrates a conventional propellant composition using dioctyl adipate (DOA) as an internal plasticizer with a propellant of the type exemplified in Table I while Table III shows a conventional propellant with no plasticizer.

TABLE II

| FORMULATION OF DOA ANALOG PLASTICIZED PROPELLANT | |
|---|---|
| INGREDIENT | PARTS BY WEIGHT OF MIX |
| DOA | 2.0 |
| MAGNESIUM OXIDE | 0.025 |
| ALUMINUM | 22.0 |
| AP 200μ | 51.0 |
| AP 6900μ | 17.0 |
| MALEIC ANHYDRIDE | 0.025 |
| TRIPHENYL BISMUTH | 0.025 |
| R45M BINDER | 8.0 |

Table IV provides gel fractions of the propellants while Table V discloses plasticizer viscosities in R-45M. Table VI sets forth the physical properties of the two propellant mixtures for purposes of comparison. It can be seen that the plasticizer of this invention provides the propellant with physical characteristics as good or better than dioctyl adipate while simultaneously providing a solution to the problem of plasticizer migration.

TABLE III

| FORMULATION OF ANALOG SPACE PROPELLANT | |
|---|---|
| INGREDIENT | PARTS BY WEIGHT OF MIX |
| MAGNESIUM OXIDE | 0.025 |
| ALUMINUM | 21.0 |
| AP 200μ | 48.3 |
| AP 6900μ | 20.7 |
| OCTADECYL ISOCYANATE | 0.04 |
| MALEIC ANHYDRIDE | 0.025 |
| TRIPHENYL BISMUTH | 0.025 |
| R45M BINDER | 9.96 |

TABLE IV

| GEL FRACTIONS OF ANALOG PLASTICIZED PROPELLANTS | | | |
|---|---|---|---|
| PROPELLANT FROM | MIX NO. | GEL FRACTION | AMBIENT STRESS |
| Table III | 8823T | 0.413 | 103 |
| Table II | 8774T | 0.461 | 162 |
| Table I | 230 | 0.489 | 163 |
| Table I | 231 | 0.650 | 221 |

TABLE V

| VISCOSITIES OF PLASTICIZERS IN R-45M | | | |
|---|---|---|---|
| Temp °F. | R-45M | Plasticizer of Table II | Plasticizer of Table I |
| 128° F. | 293[2] | 146 | 204 |
| 74° F. | 1281 | 448 | 542 |
| 28° F. | 6520 | 1808 | OFF SCALE |

[1]20% PLASTICIZER USED IN R-45M.
[2]ALL VISCOSITIES GIVEN IN CPS.

TABLE VI

PHYSICAL PROPERTIES OF PLASTICIZED PROPELLANTS

| | −65° F. TEST TEMPERATURE | | |
|---|---|---|---|
| Propellant from | STRESS | STRAIN MAX*/FAIL** | MODULUS |
| Table II | 730 | 9/17 | 20,400 |
| Table I | 955 | 5/7 | 43,100 |

| PROPELLANT | AMBIENT TEST TEMPERATURE | | | 165° F., TEST TEMPERATURE | | |
|---|---|---|---|---|---|---|
| FROM | STRESS | MAX*/FAIL** | MODULUS | STRESS | MAX*/FAIL** | MODULUS |
| Table II | 162 | 26/28 | 1310 | 133 | 25/26 | 1180 |
| Table I | 163 | 24/28 | 1760 | 133 | 20/21 | 1250 |

*STRAIN AT MAX STRESS
**RUPTURE STRAIN

TABLE VII

PHYSICAL PROPERTIES OF ANALOG PLASTICIZED PROPELLANTS

| Propellant From | Mix No. | Cure Ratio | Binder to Plasticizer Ratio | −65° F. Test Temperature | | |
|---|---|---|---|---|---|---|
| | | | | Stress | Strain Max*/Fail** | Modulus |
| Table II | 118 | 0.77 | 80:20 | | | |
| | 117 | 0.80 | 80:20 | | | |
| | 119 | 0.83 | 80:20 | | | |
| | 8774T | 0.77 | 80:20 | 730 | 8.5/17 | 20,400 |
| Table I | 228 | 0.75 | 85:15 | | | |
| | 230 | 0.85 | 85:15 | 955 | 4.9/6.5 | 43,100 |
| | 231 | 0.95 | 85:15 | | | |

| Ambient Test Temperature | | | 165° F., Test Temperature | | | Shore A |
|---|---|---|---|---|---|---|
| Stress | Strain Max*/Fail** | Modulus | Stress | Strain Max*/Fail** | Modulus | |
| Table II | | | | | | |
| 134 | 22/24 | 1060 | | | | 67 |
| 134 | 15/16 | 1330 | | | | 62 |
| 212 | 9.2/10.2 | 4776 | | | | 78 |
| 162 | 26/28 | 1310 | 133 | 25/26 | 1180 | 72 |
| Table I | | | | | | |
| 76 | 21/46 | 518 | | | | 50 |
| 163 | 24/28 | 1760 | 133 | 20/21 | 1250 | 72 |
| 221 | 10/11 | 3607 | | | | 80 |

*Strain at max stress
**Rupture strain

While the present invention has been described by reference to a particular embodiment thereof, it should be understood by those skilled in the art that all the modifications that are embodied within the scope of the appended claims are intended to be included herein.

What is claimed is:

1. A solid propellant composition comprising a cured homogenous mixture of:
   A. a solid, particulate oxidizer component;
   B. a synthetic resinous, isocyanate cured, polybutadiene binder component; and
   C. a carbamic acid ester plasticizer having the following structural formula:

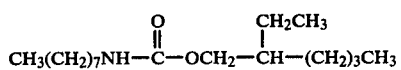

wherein said plasticizer is present in a binder/plasticizer ratio ranging from about 75 to 95 parts by weight of binder to 5 to 25 parts by weight of plasticizer.

* * * * *